Figure 1:
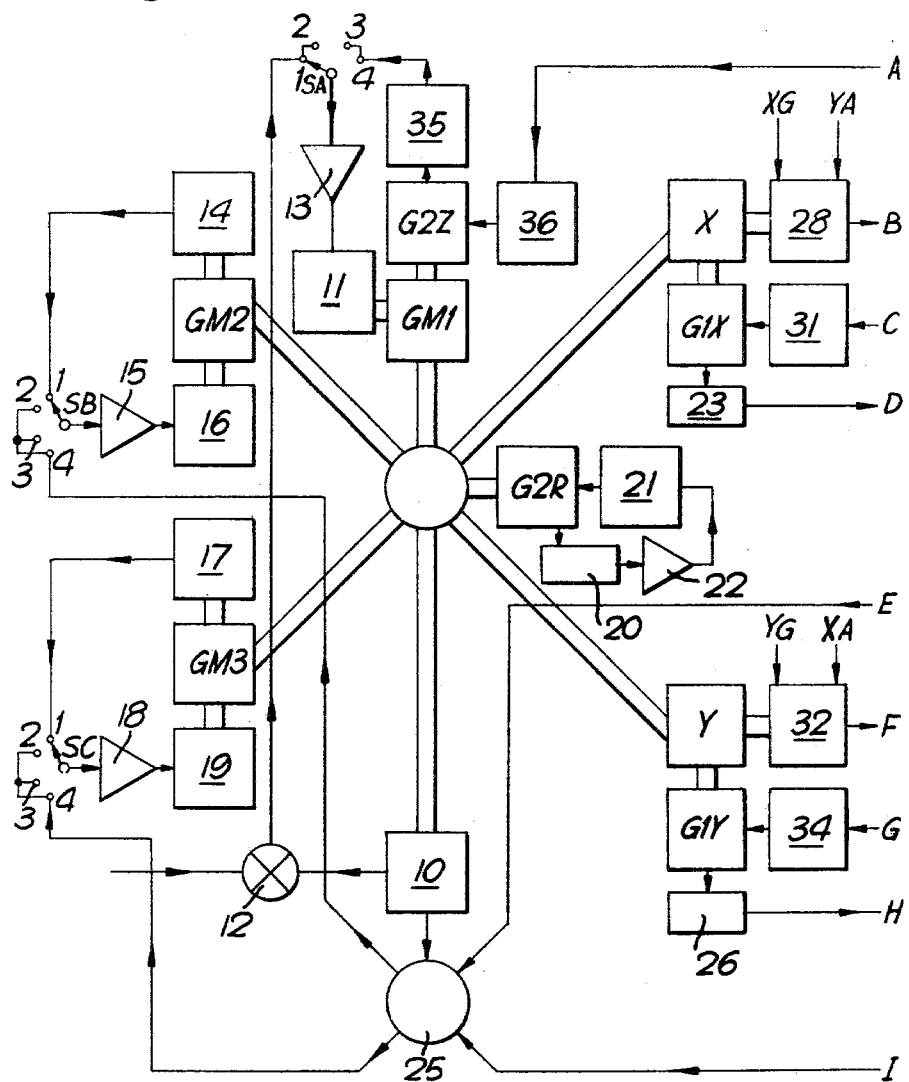

United States Patent [19]

Liebing

[11] 4,292,854
[45] Oct. 6, 1981

[54] GYROSCOPIC APPARATUS HAVING THREE-AXIS INERTIAL PLATFORM WITH RAPID WARM-UP

[75] Inventor: Alan P. Liebing, West Linton, Scotland

[73] Assignee: Ferranti Limited, Cheadle, England

[21] Appl. No.: 4,871

[22] Filed: Jan. 19, 1979

Related U.S. Application Data

[63] Continuation-in-part of Ser. No. 733,884, Oct. 19, 1976, abandoned.

[51] Int. Cl.³ .............................................. G01C 19/30
[52] U.S. Cl. ....................................... 74/5.34; 33/321; 74/5.47
[58] Field of Search ..................... 74/5.34, 5.41, 5.47; 33/321, 323

[56] References Cited

U.S. PATENT DOCUMENTS 3,237,313  3/1966  Gevas .............................. 33/321 X
3,267,745  8/1966  Smead et al. ................... 74/5.41 X
3,269,024  8/1966  Fischer et al. .................. 33/321 X
3,790,766  2/1974  Brown ............................. 74/5.34 X
3,979,090  9/1976  Brickner et al. ................ 33/321 X

FOREIGN PATENT DOCUMENTS 594953  3/1960  Canada ............................... 74/5.47

Primary Examiner—Rodney H. Bonck
Attorney, Agent, or Firm—Kerkam, Stowell, Kondracki & Clarke

[57] ABSTRACT

An inertial platform carries at least one dynamically-tuned free-rotor gyro and is mounted in a three-axis gimbal system. Accelerometers are carried on the platform with their sensitive axes aligned with the two sensitive axes of the gyro. During alignment of the platform, and while the gyro motor is being run up to speed, the output of the gyro pick-off on each axis is combined with the output of the accelerometer on the other axis and applied through a resolver to the appropriate gimbal torque motor.

6 Claims, 3 Drawing Figures

GYROSCOPIC APPARATUS HAVING THREE-AXIS INERTIAL PLATFORM WITH RAPID WARM-UP

This invention is a continuation-in-part of copending application Ser. No. 733,884 filed Oct. 19, 1976 for Gyroscopic Apparatus, now abandoned.

This invention relates to gyroscopic apparatus, and in particular to such apparatus which includes the so-called "dynamically-tuned free rotor" gyro.

A dynamically-tuned free rotor gyro comprises an inertial element mounted on a drive shaft by means of a spring coupling so that the element may be rotated by the drive shaft and yet be free to pivot about another axis. Such a gyro is so designed that the spin frequency of the drive shaft is equal to the natural frequency of vibration of the inertial element when rotating on its spring support. Under these conditions therefore, the inertial element is very sensitive to angular displacements of the drive shaft axis. Displacement of the inertial element relative to the drive shaft may be measured about two perpendicular axes lying in the plane of rotation of the inertial element, and hence the free rotor gyro may be used in place of two single-axis gyros. In an inertial platform there are three mutually perpendicular axes to be stabilised. It is therefore possible to use a single free rotor gyro together with a conventional single-axis gyro, or to use two free rotor gyros.

Inertial platforms are commonly fitted in aircraft, and the time necessary to align a platform before an aircraft can take off is very important. A platform has to go through a sequence of procedures before the aircraft can take off, and this sequence can take several minutes. Some of this time is taken up by waiting for the gyros to run up to speed. It is also common practice to vary the gain of the levelling servo loops in stages, and this also takes time.

It is an object of the invention to provide a three-axis inertial platform having at least one dynamically-tuned free rotor gyro, which may be more rapidly aligned, and a method of performing such alignment.

According to the present invention there is provided gyroscopic apparatus which includes a platform carried in a three-axis gimbal system, a shaft encoder and a torque motor connected to each axis of the gimbal system, at least one dynamically tuned free-rotor gyro carried on the platform and having two sensitive axes, a gyro pick-off carried on each sensitive axis of the gyro, two accelerometers carried on the platform and having their sensitive axes aligned with the two sensitive axes of the gyro, resolving means responsive to the output of the gyro pick-off on each sensitive axis of the gyro to apply resolved signals to the gimbal torque motors as appropriate, and signal combining means operable when the gyro motor is running up to its normal operating speed to combine with the output of each gyro pick-off the output of the accelerometer on the other gyro sensitive axis.

Also according to the invention there is provided a method of aligning gyroscopic apparatus of the type defined in the preceding paragraph, which includes the steps of (a) connecting the output of the shaft encoder on each gimbal axis to the torque motor on that axis, prior to running the gyro motor up to its normal operating speed; (b) on each of the two sensitive axes of the free-rotor gyro combining the output of the gyro pick-off with the output of the accelerometer on the other axis, resolving the two combined outputs about the two axes, and applying the resolved components to the gimbal torque motors on the two axes whilst the gyro spin motor is running up to its normal operating speed; and (c) when the gyro spin motor is running at its normal operating speed, connecting the output of the gyro pick-off on each axis to the torque motor on the same axes and applying control signals to the gyro torques.

The invention will now be described with reference to FIGS. 1 and 2 of the accompanying drawings, which show, in block schematic form, the various parts of an inertial platform using two free rotor gyros. The double lines indicate mechanical connections, for example between gimbal axis, shaft encoder and torque motor.

Figure 3:
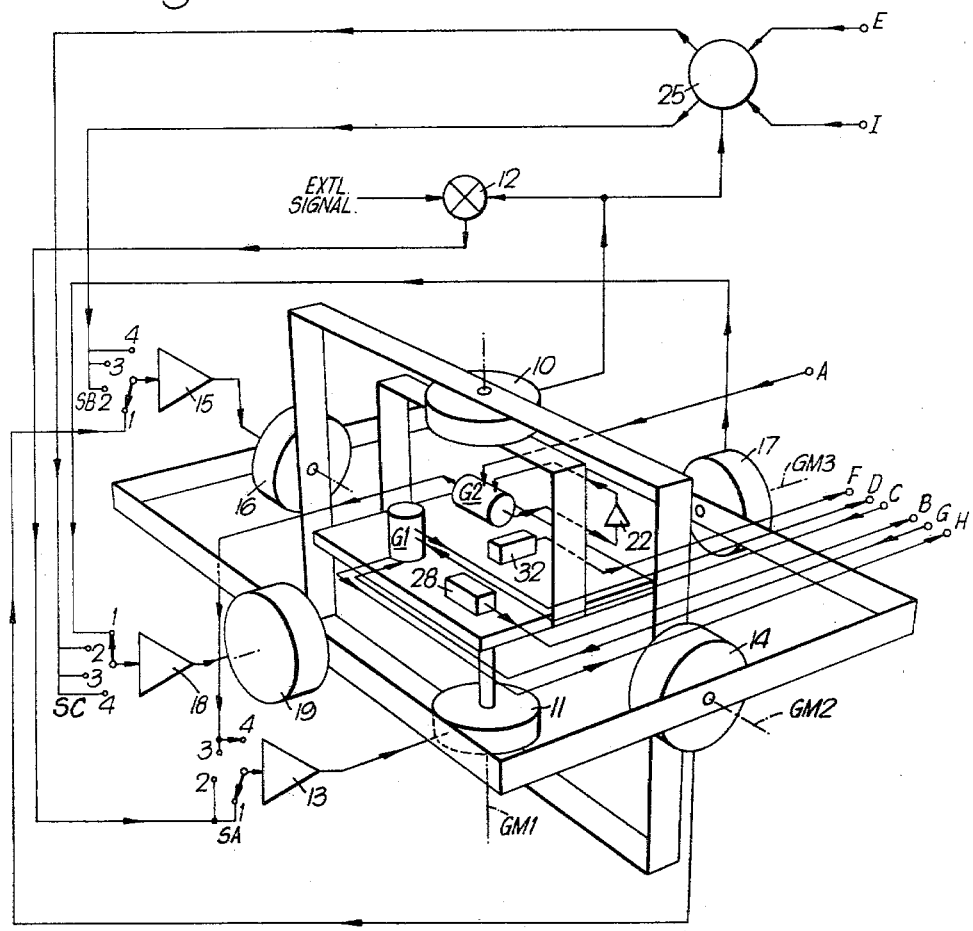

FIG. 3 is an isometric drawing illustrating, in schematic form, the mechanical structure and related electronic circuitry of the gyro system of the present invention.

Figure 2:
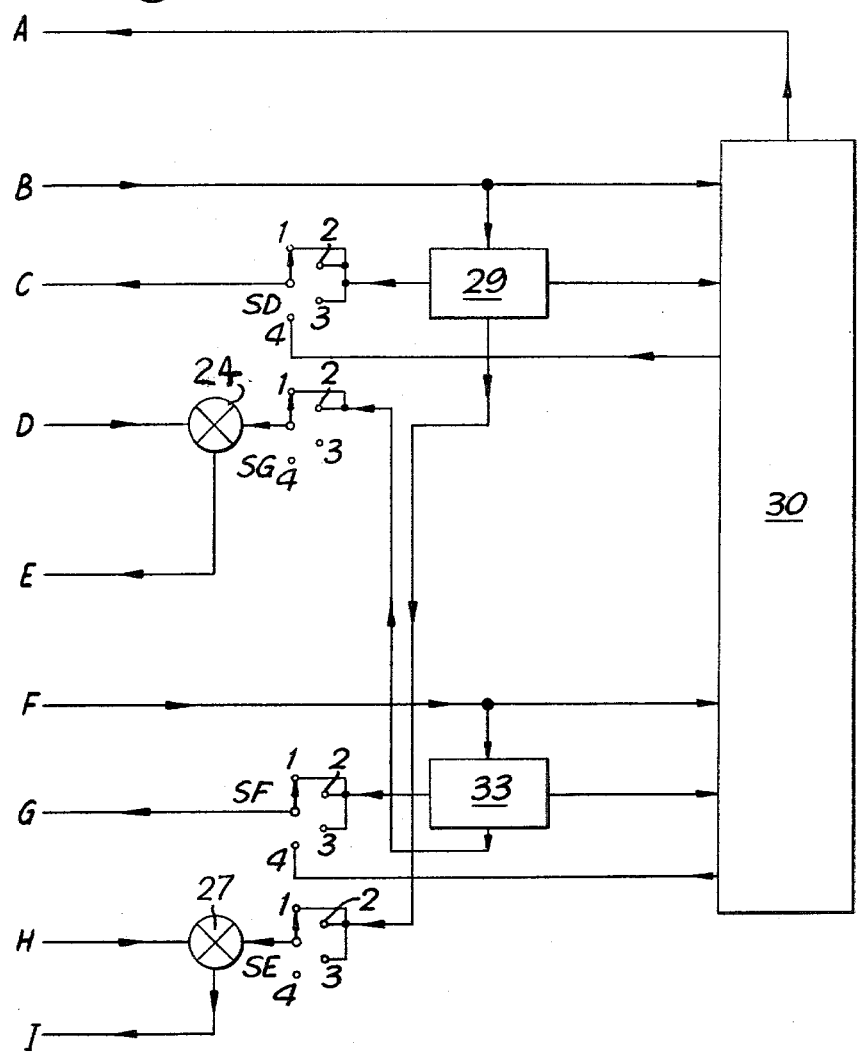

Referring to FIGS. 1 and 3 one of the two free rotor gyros, referred to as gyro G1, has two perpendicular axis G1X and G1Y, each of which is provided with a gyro pick-off and torquer. These axes may conveniently coincide with the X and Y axes of the platform, and each is provided with an accelerometer.

The second free rotor gyro, gyro G2, also has two perpendicular axes. One of these, axis G2Z, coincides with the third or Z axis of the platform, and again is provided with a pick-off and a torquer. The other axis of gyro G2, labelled axis G2R in the drawing, is redundant, because it is paralell to an axis of gyro G1 and has its pick-off and torquer connected in a closed loop to prevent it wandering.

The three gimbal axes of the platform, referred to as axes GM1, GM2 and GM3, are each provided with a shaft encoder and a torque motor. For convenience, gimbal axes GM1, GM2 and GM3 may be considered to be, respectively, azimuth, roll and pitch.

As the drawing indicates, gimbal axis GM1, the azimuth axis, coincides with the axis G2Z of gyro G2. On this axis is a shaft encoder 10 and a gimbal torque motor 11. The output of the shaft encoder is applied, via summator 12, switch SA and amplifier 13, to the torque motor 11. The other input to the summator 12 is an external reference signal. The external reference signal is necessary in order to provide the correct azimuth alignment of the platform. Although the accelerometers, acting as gravity sensors, will provide a datum for each of the pitch and roll axes, the azimuth axis datum is not so clearly defined. For example, if the platform is mounted in an aircraft, a common use of inertial platforms, the aircraft may be "pointing" in any direction. Consequently, an external reference must be supplied, such as a compass output, indicating the heading of the aircraft so that the correct azimuth alignment (e.g. North) may be established. The signal must be fed in via the summator 12 because it has to be added to any signal generated by the shaft encoder 10 indicating the alignment relative to the datum of the platform azimuth axis. Gimbal axis GM2 has its shaft encoder 14 connected via switch SB and amplifier 15 to torque motor 16, whilst gimbal axis GM3 has its shaft encoder 17 connected via switch SC and amplifier 18 to torque motor 19.

As already stated, the other axis, G2R or gyro G2 has its pick-off 20 and torquer 21 connected in a closed loop via amplifier 22. This loop would not be necessary if a single-axis gyro was used for gyro G2.

The two gyro axes G1X and G1Y relate to gyro G1 which for the purposes of this invention must be a dynamically-tuned free-rotor gyro. The gyro pick-off 23 on axis G1X applies signals to one input of a summator 24. The output of the summator is applied to a resolver 25. Similarly, the gyro pick-off 26 on axis G1Y applies signals to one input of a summator 27 which also has its output connected to the resolver 25. On axis X of the platform is mounted an accelerometer 28. This accelerometer is in fact positioned so as to respond to acceleration of the platform along the Y axis of the platform, but to sense gravity when tilted about the X axis. The output of the accelerometer is connected to a levelling filter 29 and to a navigation computer 30. The output of the levelling filter 29 is connected through a switch SD to the gyro torquer 31 on the X axis, and also through a switch SE to a second input of the summator 27 already referred to.

In a similar manner, axis Y of the platform carries an accelerometer 32 positioned so as to respond to platform acceleration along the X axis of the platform, and to sense gravity tilt about the Y axis. The output of this accelerometer is connected to a levelling filter 33 and to the navigation computer 30. The output of the levelling filter 33 is connected through a switch SF to the gyro torquer 34 on the Y axis, and also through a switch SG to a second input of the summator 24.

Outputs from the navigation computer may also be applied to the gyro torquers 31 and 34 through switches SD and SF.

Resolver 25 resolves the inputs into components about the perpendicular gimbal axes GM2 and GM3, and applies the appropriate components to the gimbal torque motors 16 and 19 via switches SB and SC respectively.

Switch SA may be operated to connect the gyro pick-off 35 on axis G2Z directly to the gimbal torque motor 11 on the gimbal axis GM1, whilst the gyro torquer 36 on that axis is connected directly to the navigation computer 30.

Each of the seven switches SA to SG is a four-position switch; in two cases, namely SE and SG, there is no connection to positions 3 and 4. The switches are operated in accordance with a sequence of steps in the platform alignment procedure, and the numbers of the steps are indicated in the drawing alongside the switch contacts.

The platform alignment procedure will now be described in detail. It is assumed that the gyros have been switched off and that the platform has come to rest with all axes out of alignment. The alignment procedure is in three stages, followed by the normal "navigate" mode under the control of the navigation computer.

The first step requires that all the switches SA to SG are in position 1. In this position, the shaft encoders on axes GM2 and GM3 are connected directly to the corresponding gimbal torque motors. The shaft encoder 10 on axis GM1 is connected to the torque motor 11 on the same axis under the control of the external reference signal via summator 12. The three shaft encoders 10, 14, 17 deliver outputs indicating any misalignment between the gimbal axes and the axes of the vehicle in which it is mounted and hence the effect of this step is to drive the torque motors 11, 16, 19 until the gimbal axes are, at least roughly, aligned with the vehicle axes. This is a very rapid process, taking only one or two seconds, and may also be adopted with platforms using conventional gyros. Any outputs from the gyro pick-offs are disconnected from the torque motors at this stage, and hence have no effect.

Also during the first stage the gyro spin motors are switched on so that they can start running up to normal speed.

For the next step of the alignment procedure, the switches are moved to position 2. This only affects the connections of switches SB and SC. It is therefore only gyro G1 which is stabilised; gyro G2 remains under the control of the external reference signal. Due to existing misalignment of the vehicle axis with respect to the vertical, the two accelerometers will indicate the tilt of the stationary platform about the pitch and roll axes. As already explained, the accelerometer 28 on the X axis of the platform is sensitive to tilt about this axis but to actual accelerations along the Y axis. The output of this accelerometer is passed through the levelling filter 29 and switch SE to the summator 27. Here it is added to the output of the gyro pick-off 26 on the Y axis of the platform, indicating the actual off-set of that gyro axis. The summated signal is applied to the resolver 25. The output of the resolver is applied to the gimbal torque motors 16 and 19 in the normal servo manner to maintain a small output from the summator 27. The gyro axis is thus off-set by an amount dependent on the accelerometer input to the summator. As long as the gyro has not attained its normal running speed, its suspension is not tuned to the running speed, and hence a spring coupling exists within the gyro. The gyro off-set thus acts on this spring coupling and hence causes the gyro rotor to precess about the axis G1X, which in turn reduces the tilt sensed by the accelerometer 28.

In a similar manner, tilt about the Y axis of the platform is sensed by accelerometer 32, the output of which is added by summator 24 to the output of gyro pick-off 23. The summated signal is resolved by resolver 25 and applied to the gimbal torque motors 16 and 19 to deflect the X axis, and causes precession about the axis G1Y, thereby reducing the tilt.

The spring coupling in the gyro decreases as the gyro spin motor approaches its normal speed, and hence the rate of acceleration of the motor is arranged to allow time for this stage to be completed. During the above procedure the accelerometer outputs are also applied through the levelling filters to the gyro torquers, but the effect of these signals is very small compared with the precession created by the spring coupling.

During the first two stages gyro G2 is aligned about axis G2Z by the external reference signal.

Step 3 of the alignment procedure follows when the gyro spin motor is running at its normal speed and the switches are moved to position 3. There is now no spring coupling between gyro axes, and the technique of step 2 is no longer available. The switches now allow all three axes to be controlled directly by the gyro pick-offs. The tilt error should be very small following the first two stages and hence the accelerometer outputs should be small or non-existent. On each axis the gyro pick-off signal is applied to the appropriate gimbal torque motor. The levelling loops are now under control of the gyro torquers and these are arranged to have time constants such that movements of the vehicle carrying the platform do not affect the platform alignment. Such movements may be due to starting aircraft engines, movement of personnel, and so on. The outputs of the levelling filters can now be processed by the navigation computer for further refined alignment techniques, for example gyroscompassing.

The three steps detailed above complete the alignment procedure. For normal use the switches are moved to position 4 so that the gyro torquers on all three axes come under the control of the navigation computer 30. This receives inputs from the accelerometers, the levelling filters usually being disregarded in this mode.

The main saving in time in the procedure detailed above is due to the fact that the second step relies on the spring coupling existing when a dynamically-tuned free-rotor gyro is running below its designed speed. Hence the acceleration time of the motor is used to advantage to give a fast levelling response initially which automatically lengthens its response time to the slow response required for minimising the effects of vehicle movement. The vertical alignment phase is virtually completed within the run-up time of the gyro. In a conventional system using the gyro torque motors only, the run-up time is usually wasted time due to the high drift rate which can occur with a dynamically-tuned free-rotor gyro when it is not running at its designed speed. This is because the gyro pick-off does not necessarily give a true indication of the position where the gyro suspension is undeflected. The resulting deflection and spring rate act to bias the levelling loops away from the position indicated by the accelerometers as being the true vertical. Due to the time-varying nature of the spring rate as the gyro motor accelerates it is difficult to allow for this effect with known techniques whereas the present invention introduces a fixed error throughout the alignment procedure that is proportional to the pick-off error, and this is both small and more readily allowed for. A further advantage is that much higher precession rates can be achieved using the method of the invention than would normally be achieved using a conventional gyro torquer. This permits the more rapid removal of larger initial misalignments, which is turn means that the first step of the procedure may be carried out more quickly.

The procedure described above will still apply if the platform has only one dynamically-tuned free-rotor gyro, since stabilisation of the third axis is usually from an external source.

What I claim is:

1. Gyroscopic apparatus which includes a platform carried in three-axis gimbal system, a shaft encoder and a torque motor connected to each axis of the gimbal system, at least one dynamically-tuned free-rotor gyro carried on the platform and having two sensitive axes, a gyro pick-off carried on each sensitive axis of the gyro, two accelerometers carried on the platform and having their sensitive axes aligned with the two sensitive axes of the gyro, resolving means responsive to the outputs of the gyro pick-off on each sensitive axis of the gyro to apply resolved signals to the gimbal torque motors as appropriate, and signal combining means operable when the gyro is running up to its normal operating speed to combine with the output of each gyro pick-off the output of the accelerometer on the other gyro sensitive axis.

2. Gyroscopic apparatus as claimed in claim 1 in which the signal combining means include, for each sensitive axis of the gyro, summator operable to combine said two outputs.

3. Gyroscopic apparatus as claimed in claim 2 which includes filter means through which the output of an accelerometer is applied to the appropriate summator.

4. Gyroscopic apparatus as claimed in claim 2 which includes switching means operable to connect said two outputs to the summator only when the gyro is running up to its normal operating speed.

5. Gyroscopic apparatus as claimed in claim 4 in which the switching means is operable, prior to the gyro being run up to speed, to connect the output of each gimbal axis shaft encoder to the gimbal torque motor on that axis.

6. A method of aligning gyroscopic apparatus including a platform carried in a three-axis gimbal system, a shaft encoder and a torque motor connected to each axis of the gimbal system, at least one dynamically tuned free-rotor gyro carried on the platform and having two sensitive axes, a gyro pick-off carried on each sensitive axis of the gyro, two accelerometers carried on the platform and having their sensitive axes aligned with the two sensitive axes of the gyro, resolving means responsive to the outputs of the gyro pick-off on each sensitive axis of the gyro to apply resolved signals to the gimbal torque motors as appropriate, and signal combining means operable when the gyro is running up to its normal operating speed to combine with the output of each gyro pick-off the output of the accelerometer on the other gyro sensitive axis, which method includes the steps of (a) connecting the output of the shaft encoder on each gimbal axis to the gimbal torque motor on that axis, prior to running the gyro to its normal operating speed; (b) on each of the two sensitive axes of the free-rotor gyro combining the output of the gyro pick-off with the output of the accelerometer on the other axis, resolving the two combined outputs about the two axes, and applying the resolved components to the gimbal torque motors of the two axes whilst the gyro is running at its normal operating speed; and (c) when the gyro is running at its normal operating speed, connecting the output of the gyro pick-off on each axis to the gimbal torque motor on the same axis and applying control signals to the gyro torquers.

* * * * *